(12) United States Patent
Rice

(10) Patent No.: US 7,583,120 B2
(45) Date of Patent: Sep. 1, 2009

(54) POWER SUPPLY CONTROLLER AND METHOD THEREFOR

(75) Inventor: Benjamin M. Rice, Attleboro, MA (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 402 days.

(21) Appl. No.: 11/561,990

(22) Filed: Nov. 21, 2006

(65) Prior Publication Data

US 2008/0116865 A1    May 22, 2008

(51) Int. Cl.
*H03K 3/017* (2006.01)

(52) U.S. Cl. .................. 327/172; 327/176; 327/309; 327/315; 323/268

(58) Field of Classification Search .............. None
See application file for complete search history.

(56) References Cited

U.S. PATENT DOCUMENTS

| | | | |
|---|---|---|---|
| 6,683,441 B2 * | 1/2004 | Schiff et al. .............. 323/222 |
| 6,977,489 B2 | 12/2005 | Isham | |
| 7,057,381 B2 | 6/2006 | Harriman et al. | |
| 7,098,637 B2 | 8/2006 | Jauregui et al. | |

* cited by examiner

*Primary Examiner*—An T Luu
(74) *Attorney, Agent, or Firm*—Robert F. Hightower

(57) ABSTRACT

In one embodiment, an error amplifier of a power supply controller is configured to receive a current sense signal prior to the current sense signal undergoing amplification.

19 Claims, 5 Drawing Sheets

POWER SUPPLY CONTROLLER AND METHOD THEREFOR

BACKGROUND OF THE INVENTION

The present invention relates, in general, to electronics, and more particularly, to methods of forming semiconductor devices and structures.

In the past, the semiconductor industry utilized various methods and structures to build power supply controllers to regulate the output voltage of a power supply system. As power supply controller technology has progressed, recent high efficiency power supply controllers were designed to provide a synthesized output impedance in order to increase the efficiency and minimize power dissipation within the power supply system. The synthesized output impedances also assisted in minimizing overshoot and undershoot to rapid changes in the current supplied to the load which was often referred to as a load transient. Often, the power supply system had multiple output channels that assisted in providing a large output current at a low voltage. The multi-channel controllers generally utilized an error signal that included information proportional to the current in the output inductor in order to regulate the output voltage. Usually, a chain of amplifiers and resistances was used to convert the load current information to a signal that was used by the controller to regulate the output voltage. The amplifiers typically introduced errors that affected the accuracy of the output voltage. The amplifier loops generally also were rather complex and costly.

Accordingly, it is desirable to have a power supply controller that has a less complex configuration, that minimizes errors in the output voltage, and that has a lower cost.

For simplicity and clarity of the illustration, elements in the figures are not necessarily to scale, and the same reference numbers in different figures denote the same elements. Additionally, descriptions and details of well-known steps and elements are omitted for simplicity of the description. As used herein, current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
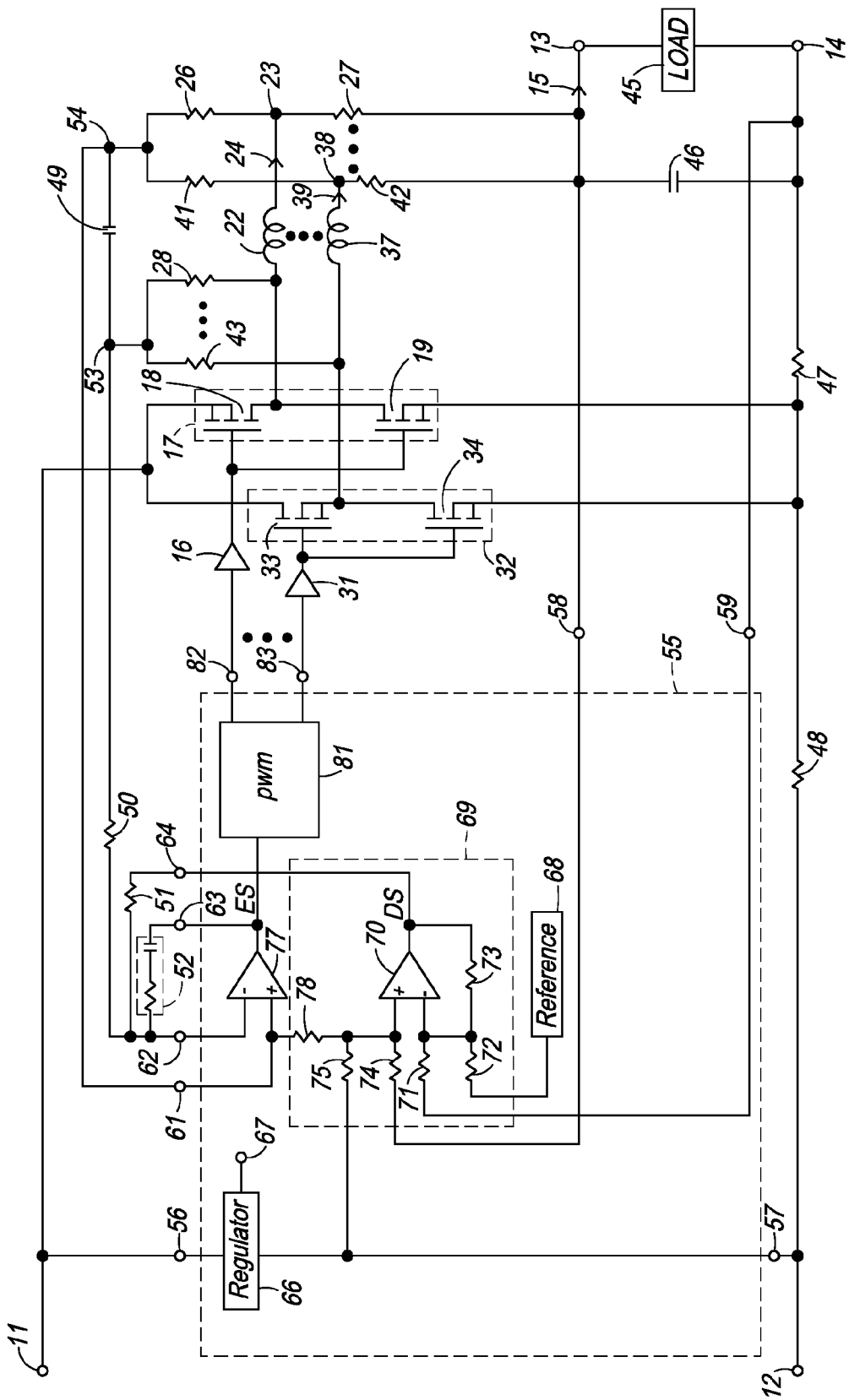
FIG. 1 schematically illustrates an embodiment of a portion of a power supply system having a power supply controller in accordance with the present invention.

FIG. 1 schematically illustrates an embodiment of a portion of a power supply system 10 that includes a power supply controller 55. System 10 receives power, such as a rectified dc voltage, between a power input terminal 11 and a power return terminal 12. System 10 is configured as a multi-channel switching control system that utilizes N number of channels to regulate an output voltage between an output 13 and an output return 14 and to also provide an output current 15 to a load 45. A filter capacitor 46 typically is connected between output 13 and return 14 to smooth the output voltage. Each channel of the multi-channel system provides a channel current through a channel inductor, and the N number of channel currents are summed at output 13 to form load current 15. For the exemplary embodiment illustrated in FIG. 1, N is equal to two, however, those skilled in the art will appreciate that system 10 may have any number of channels including a single channel. Power supply controller 55 typically has N number of outputs, such as outputs 82 and 83, that each provides a switching control signal for each channel of system 10. External to controller 55, each channel includes a current steering circuit that receives the switching control signal and forms the individual channel current. For example, a first current steering circuit receives a first switching control signal from output 82 and includes a switch driver 16, a power control element 17, an inductor 22, an averaging resistor 26, and a filter resistor 28. For the embodiment illustrated in FIG. 1, power control element 17 typically includes a pair of power transistors, such as a P-channel MOS transistor 18 and an N-channel MOS transistor 19, configured in a stacked configuration. Although not shown in FIG. 1, element 17 may include other logic that prevents transistors 18 and 19 from being enabled simultaneously in order to prevent shoot through currents through element 17. A current 24 illustrates the channel current that is provided to output 13 through the first current steering circuit. The value of each channel current may be very large. For example, load current 15 may be up to two hundred amperes (200 amps) and each channel current may be between ten to thirty amperes (10 to 30 amps) or higher. The first current steering circuit typically is connected to output 13 through a conductor that conducts current 24 to output 13. The large current carried by the conductor usually forms a voltage drop across the parasitic resistance of the conductor. This parasitic resistance is illustrated as a parasitic resistor 27. The voltage dropped across resistor 27 by the large current can result in an error in the value of the output voltage. As will be seen further hereinafter, the configuration of controller 55 assists in canceling this undesirable error voltage from the output voltage. The second current steering circuit is similar to the first current steering circuit and similarly includes a switch driver 31, a power control element 32, an output inductor 37, an averaging resistor 41, a filter resistor 43, and a parasitic resistor 42.

Load current 15 usually is very large and flows from load 45 through a conductor that is connected between return 14 and return terminal 12. This conductor also has a parasitic resistance that is illustrated by parasitic resistors 47 and 48. As will be seen further hereinafter, controller 55 is configured to also assist in canceling this undesirable error voltage from the output voltage.

Figure 2:
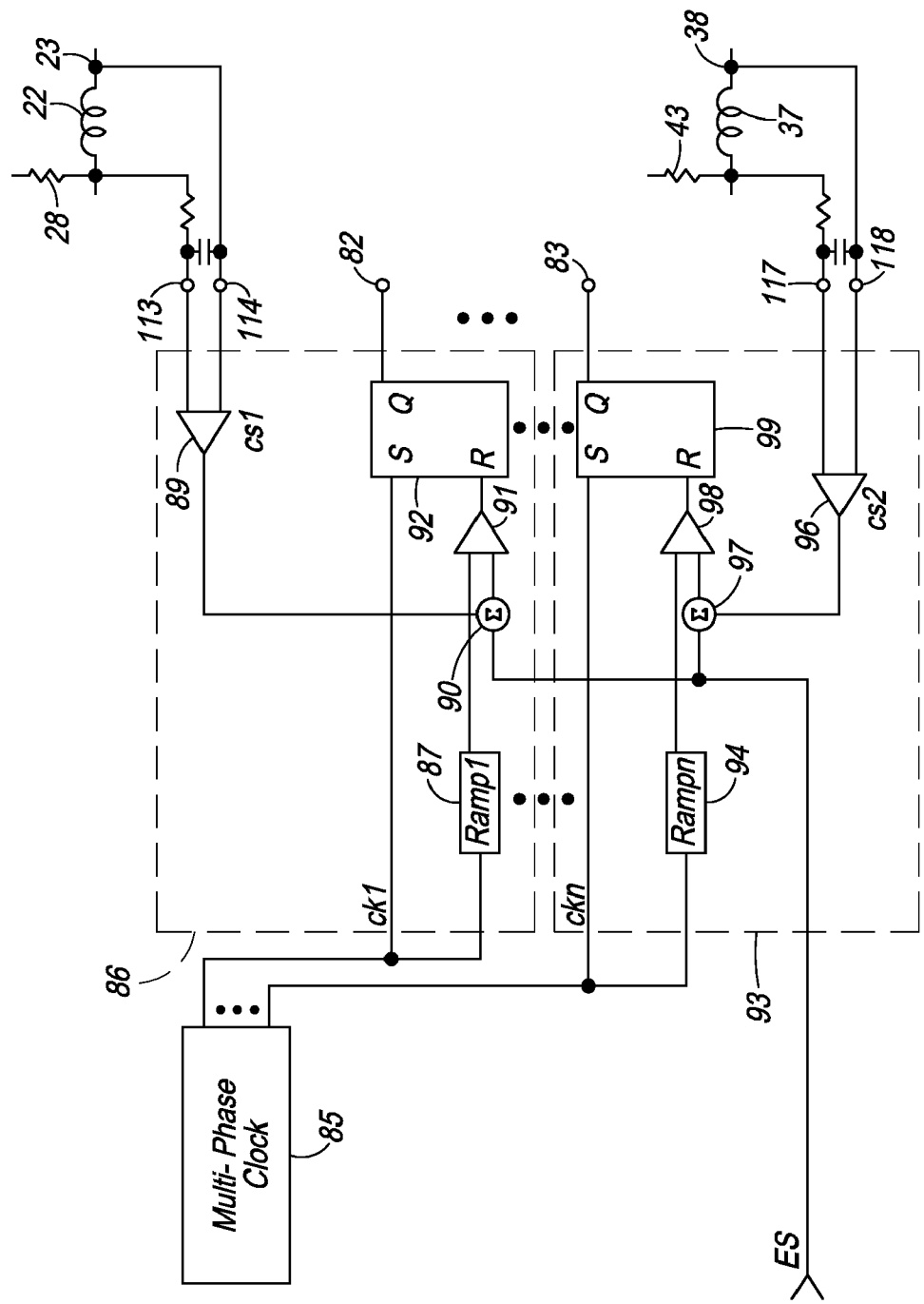
FIG. 2 schematically illustrates an embodiment of a portion of the power supply controller of FIG. 1 in accordance with the present invention.

Controller 55 is connected between terminals 11 and 12 to receive power between a power input 56 and a power return 57. Controller 55 typically includes a difference circuit 69, an error amplifier 77, and a pulse width modulator (PWM) 81. Controller 55 may also include an internal regulator 66 that is connected between input 56 and return 57 to form an internal operating voltage on an output 67 that is utilized to provide operating power to elements of controller 55 such as circuit 69, amplifier 77, and PWM 81. As will be seen further hereinafter, error amplifier 77 generally has a high gain so that an error (ES) signal formed on the output of amplifier 77 is used by controller 55 for controlling elements 17 and 32 to attempt to maintain the signals at the inputs of amplifier 77 substantially equal. The error (ES) signal from amplifier 77 is used by PWM 81 to assist in controlling the duty cycle of the switching control signals for each channel of PWM 81. PWM 81 typically is a multi-channel PWM circuit that has the same number of channels as system 10 and generates a plurality of switching control signals that are configured to have a phase offset between each of the signals. Such PWM circuits are well known to those skilled in the art. One example of such a PWM circuit is illustrated in FIG. 2. Differential amplifier circuit 69 includes an operational amplifier 70 and various gain elements including resistors 71-75 and 78. Resistors 71-75 and 78 usually are closely matched in order to provide suitable rejection of common mode signals.

As controller 55 enables power control elements 17 and 32, respective channel currents 24 and 39 flow through respective inductors 22 and 37 and are summed together at a common node, such as output 13, to form current 15. The equivalent series resistance (ESR) of each inductor is used to form a current sense (CS) signal that is representative of load current 15. As channel currents 24 and 39 flow through respective inductors 22 and 37, the ESR of each inductor forms a corresponding voltage drop across the inductor. The output side of the current sense element formed by inductors 22 and 37 is the terminal that provides current to load 45 and in the illustrated embodiment is also connected to respective nodes 23 and 38. The input side of the current sense element formed by inductors 22 and 37 is the terminal that receives current from respective power control elements 17 and 32. Resistors 26 and 28 couple the voltage across inductor 22 to capacitor 49. Similarly, resistors 41 and 43 couple the voltage across inductor 37 to capacitor 49. Consequently, capacitor 49 becomes charged to a voltage that is representative of the time average value of all the individual channel currents, thus, the resulting voltage across capacitor 49 is representative of the time average value of current 15. Controller 55 uses the differential value of the voltage on capacitor 49 as the CS signal that is representative of the time average value of load current 15. However, resistors 26 and 41 couple a voltage to one side of capacitor 49 at a node 54 that is substantially the output voltage plus the numerical average voltage drop across respective parasitic resistors 27 and 42. Thus, the voltage across capacitor 49 is biased on top of a bias signal that is substantially the output voltage plus the numerical average voltage drop across parasitic resistors 27 and 42. This numerical average is substantially the sum of the voltage drops divided by the number of parasitic resistors. The inputs of amplifier 77 are connected to nodes 53 and 54 to differentially receive the voltage across capacitor 49 as the CS signal on node 53 that is referenced to the bias signal on node 54. Since the voltage across capacitor 49 is referenced to the bias signal, the bias signal is also coupled to amplifier 77. The opposite polarity gains applied to the signals by amplifier 77 causes any voltage in common with the signals to be cancelled. Thus, amplifier 77 removes the bias signal received on input 61 from the signal received on input 62. This function removes the bias signal from the ES signal formed on the output of amplifier 77.

As will be seen further, the output signal formed by amplifier 70 is summed with the CS signal. In order to sum these signals it is desirable to also reference the output signal of amplifier 70 to the bias signal. As will be seen subsequently, amplifier 77 also subtracts the bias signal from the signal received from amplifier 70 thereby preserving the rejection of the bias signal from the ES signal. Difference circuit 69 is configured to receive a differential feedback (FB) signal that is representative of the output voltage. Controller 55 receives the differential FB signal between a feedback input 58 and a feedback (FB) common input 59. Note that the FB signal on input 58 is referenced to the FB common signal on input 59. Difference circuit 69 receives the differential feedback (FB) signal and a reference signal from a reference generator 68 and forms a difference (DS) signal on an output of amplifier 70 that represents the difference between the differential FB signal and the reference signal. In order for the DS signal to be summed with the CS signal, it is desirable to also reference the DS signal to the bias signal. Since reference generator 68 is referenced to the potential of return 57, amplifier 70 receives the bias signal from input 61 and sums the bias signal with the differential FB signal as a portion of the DS signal. This causes the DS signal to also be referenced to the bias signal. Amplifier 70 receives the bias signal from input 61 through resistor 78. The triplet of resistors 74, 75, and 78 control the gain of the bias signal from input 61 in addition to the FB signal from input 58 to the non-inverting input of amplifier 70. The triplet of resistors 71, 72, and 73 controls the gain of both the FB common signal from input 59 and the reference signal from reference 68 to the DS signal from amplifier 69. Resistors 71-75 and 78 control the gain of the bias signal from input 61 in addition to the FB signal between inputs 58 and 59 to the DS signal from amplifier 69. In the preferred embodiment, resistors 71-75 and 78 are all equal so that amplifier circuit 69 has a unity gain. The DS signal from amplifier 70 is coupled to output 64 and through a feedback resistor 51 to the inverting input of amplifier 77. Resistor 51 is used to sum the DS signal with the differential current sense signal from capacitor 49. Since the DS signal includes the bias signal from node 54, amplifier 77 subtracts the bias signal from the DS signal. Thus, the bias signal is not included in the ES signal on the output of amplifier 77 which facilitates amplifier 77 providing an accurate error signal. Amplifier 70 also converts the differential FB signal to a single ended signal that is referenced to the bias signal to facilitate combining the feedback information with the CS information. Also note that circuit 69 assists in minimizing the effect of parasitic resistors 47 and 48. Since the minus input of amplifier 70 receives the common side of the voltage received by the load at return 14, and the positive input of amplifier 70 receives the potential of the opposite side of resistors 47 and 47 at return 12, circuit 69 subtracts the errors that would be induced by these parasitic resistances out of the DS signal, thus, preventing them from affecting the ES signal. Thus also preventing them from affecting the output voltage between terminals output 13 and return 14.

As can be seen, controller 55 combines, at inputs 61 and 62, the CS signal with the FB signal and the reference signal without the CS signal first being amplified. Thus, error amplifier 77 receives the CS signal prior to the CS signal undergoing any amplification. Since the CS signal is referenced to the bias signal, amplifier 70 is used to reference the FB signal to the value of the bias signal and error amplifier 77 is used to subtract the potential of the bias signal out thereby removing it from the error signal. The values for a compensation element 52 and the gain element resistor 51 are selected to provide a high dc gain for the amplifier circuit formed by error amplifier 77 and these elements. The dc gain of this amplifier circuit usually is greater than one thousand (1000) and preferably is between approximately ten thousand and one million (10,000-1,000,000). It is desirable to keep the minimum gain greater than one thousand (1000), and although the gain may vary over temperature and voltage, those skilled in the art will recognize that via the virtues of negative feedback, this high gain will minimize the effect that gain variations make on the output voltage. Not amplifying the CS signal prior to forming the error signal facilitates minimizing errors in the ES signal that is formed by error amplifier 77 thereby improving the accuracy of the output voltage and the synthesized impedance that is controlled by controller 55.

Those skilled in the art will appreciate that the value of the current sense signals generally are very low. Thus, prior art circuits used a dedicated current sense amplifier to differentially amplify such current sense signals prior to providing them to an error amplifier. These prior dedicated current sense amplifiers usually had low and very precise gains in order to synthesize the desired output impedance within a range of no greater than approximately five percent (5%). The output of the dedicated current sense amplifier was usually summed with either a reference voltage or a feedback voltage prior to being used as an input to a separate error amplifier. Such dedicated current sense amplifiers usually introduced error voltages that were significant compared to the value of the current sense signal.

Thus, configuring controller 55 to not amplify the CS signal prior to it being received by the error amplifier minimizes the possibility of such errors in the ES signal. Using amplifier 77 to combine the current sense information with the output voltage information without first amplifying the CS information allows the controller 55 to accurately control the synthesized output impedance of system 10. As will be seen hereinafter, the configuration of controller 55 synthesizes the output impedance to be a function of the equivalent series resistance of the N number of channel inductors, such as inductors 22 and 37, and includes the ratio of resistors 51 and 50 as shown by the following equations. The synthesized output impedance, Zo, of system 10 is:

$$Zo=(Vo1-Vo2)/(I1-I2).$$

where:
Zo—the synthesized output impedance between output 13 and return 14,
Vo1—the output voltage between output 13 and return 14 at a first value of current 15,
Vo2—the output voltage between output 13 and return 14 at a second value of current 15,
I1—the first value of load current 15, and
I2—the second value of load current 15.

But, $Vo=Vref-(VESR*(R51/ER50))$.

where:
Vo—the output voltage between output 13 and return 14,
Vref—the reference voltage from reference generator 68,
VESR—the numerical average voltage across the ESR of all of the N output inductors in parallel,
ER50—the value of resistor 50 plus the parallel combination of resistors R28 and R43, and
R51—the value of resistor 51.

However, $VESR=I15*ESRn$ where:

ESRn—the parallel ESR of the N channel inductors, and
I15—load current 15.

Substituting the equation for ESRn back into the equation for Vo results in:

$$Vo=Vref-(I15*(ESRn)*(R51/ER50)).$$

Substituting this Vo equation back into the Zo equation for the Vo1 and Vo2 terms results in:

$$Zo=ESRn*(R51/ER50)$$

Thus, the configuration of controller 55 forms a synthesized output impedance that may be changed by adjusting the values of resistors 50 and 51. Thus, the synthesized output impedance is not a function of any amplifiers of controller 55 or system 10. Since the value of parasitic resistors 27 and 42 generally are very small (usually just one or two (1-2) milliohms), resistors 26 and 41 can be just a couple of ohms (e.g. 1-2 ohms) and still be at least an order of magnitude greater than resistors 27 and 42, such that almost no current flows through resistors 27 and 42. The bias signal (if referenced to return 14) can be assumed to be substantially equal to the value of the output voltage plus the numerical average of the voltage dropped across resistors 27 and 42. Those skilled in the art will appreciate that without allowing for the voltage dropped across parasitic resistors 27 and 42, the desired value of the output voltage will not be achieved.

The parallel equivalent resistance of resistors 28, 43, and 50 together with capacitor 49 form a time constant that usually is selected to be substantially the same as the time constant of inductors 22 and 37 which is their inductance together with their own equivalent series resistance. In some embodiments, the RC circuit of capacitor 49 and resistors 28 and 43 may also include temperature compensation to allow for temperature drift of the ESR and inductance of inductors 22 and 37. In some embodiments, the FB signal may be a single ended signal that is referenced to return terminal 12 and resistors 71 and 75 would be omitted.

FIG. 2 schematically illustrates an embodiment of a portion of PWM 81 of power supply controller 55 that was explained in the description of FIG. 1. PWM 81 includes a multi-phase clock 85, and a plurality of PWM channels such as a first PWM channel 86 and a second PWM channel 93. Clock 85 forms a plurality of clock signals, CK1 though CKn, that assist in forming the switching control signals on outputs 82 and 83. First PWM channel 86 includes a ramp generator or ramp 87, a PWM comparator 91, a PWM latch 92, a summing circuit 90, and a current sense amplifier 89. Similarly, second PWM channel 93 includes a ramp generator or ramp 94, a PWM comparator 98, a PWM latch 99, a summing circuit 97, and a current sense amplifier 96. Those skilled in the art will appreciate that amplifiers 89 and 96 are used to form current sense signals for respective first PWM channel 86 and second PWM channel 93. Such CS signals and CS amplifiers are used to balance the channel currents between various phases of system 10. One example of a multi-phase system that include multiple ramps and multiple PWM comparators is disclosed in U.S. Pat. No. 7,057,381 that issued to Paul J. Harriman et al on Jun. 6, 2006 which is incorporated herein by reference.

Figure 3:
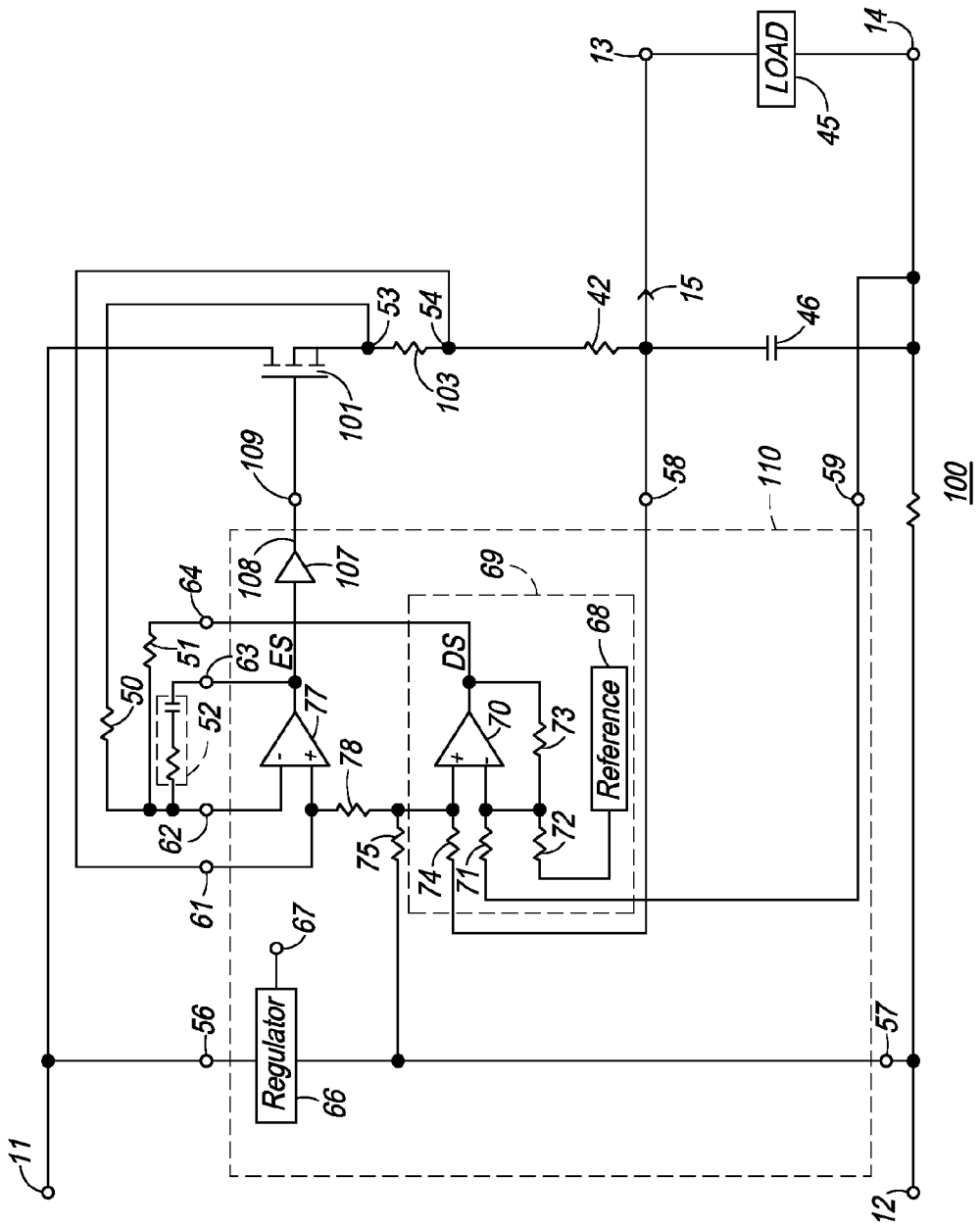
FIG. 3 schematically illustrates an embodiment of a portion of another power supply system having another power supply controller in accordance with the present invention.

FIG. 3 schematically illustrates an embodiment of a portion of a power supply system 100 that includes a linear power supply controller 110 that includes some of the element of controller 55 that were explained in the description of FIG. 1. System 100 includes a linear power control element that is illustrated in FIG. 3 as a transistor 101. Controller 110 is configured to operate transistor 101 to control the value of the output voltage between output 13 and return 14. The current steering circuit for system 100 generally includes a transistor 101, and a current sense element illustrated as a current sense resistor 103. Because system 100 does not use inductors in the current steering circuit, current sense resistor 103 is connected in series between transistor 101 and output 13. Linear power supply control systems typically do not include multiple channels such as the multiple channels illustrated in FIG. 1, however, some embodiments may utilized multiple channels in a linear type of power supply system. The current sense signal developed by resistor 103 and resulting from load current 15 forms the current sense signal on node 53 that is referenced to the bias signal on node 54. As can be seen, the current sense signal is received by error amplifier 77 prior to the current sense signal undergoing amplification. Controller 110 includes difference circuit 69, error amplifier 77, and a buffer 107. Difference circuit 69 and error amplifier 77 function similarly to the same elements in FIG. 1. Buffer 107 receives the error signal from amplifier 77 and buffers the signal before providing it to a drive output 109 of controller 110.

Figure 4:
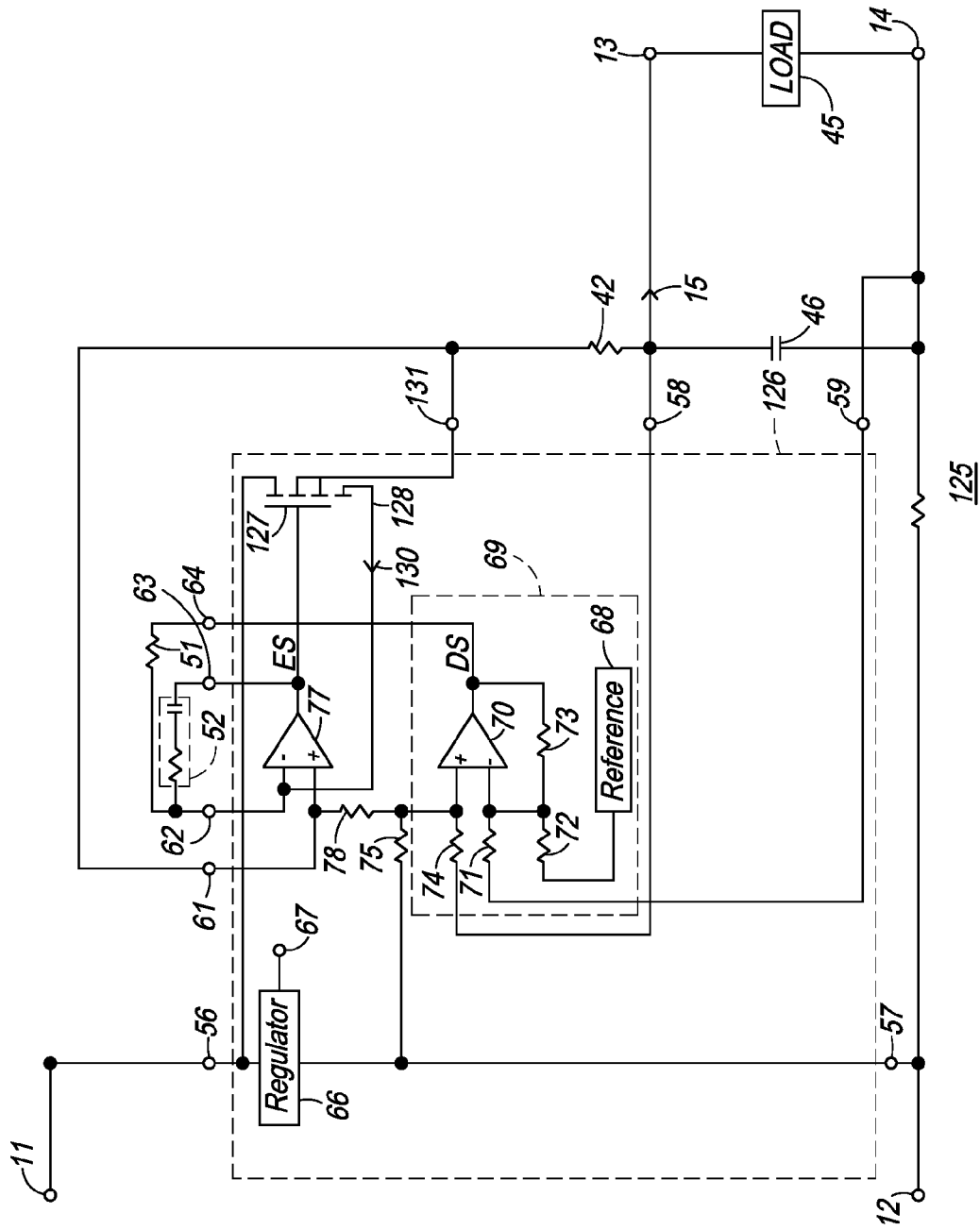
FIG. 4 schematically illustrates an embodiment of a portion of another power supply system that is an alternate embodiment of the power supply system of FIG. 3 in accordance with the present invention.

FIG. 4 schematically illustrates an embodiment of a portion of a power supply system 125 that is an alternate embodiment of system 100. System 125 includes a portion of an embodiment of a power supply controller 126 that is an alternate embodiment of controller 110 that was described in the description of FIG. 3. Controller 126 includes a SENSEFET type of transistor 127 that replaces transistor 101 and also replaces current sense resistor 103 and resistor 50. The SENSEFET type of transistor generally is formed to include a main transistor portion and a sense transistor portion. The SENSEFET type of transistor also generally includes a parasitic body diode that is not shown in FIG. 4. Typically, the SENSEFET type of transistor is formed of many transistor cells that are interconnected to form a larger transistor that can have a large load current with a low on-resistance. A few of the cells have their sources separated from the sources of the remaining cells and are brought to a separate external terminal or sense terminal. The remainder of the sources are connected together to form a source of the main transistor portion. The drains and gates of all the cells generally are common to form the respective drain and gate. SENSEFET is a trademark of Semiconductor Components Industries, LLC (SCILLC) of Phoenix, Ariz. One example of a SENSEFET type of transistor is disclosed in U.S. Pat. No. 4,553,084 issued to Robert Wrathall on Nov. 12, 1985, which is hereby incorporated herein by reference.

As load current 15 flows through transistor 127, the sense element or sense transistor 128 of transistor 127 forms a current 130 that forms the CS signal. The CS signal is received by error amplifier 77 on the inverting input of amplifier 77. Because transistor 128 is connected to the inverting input of amplifier 77, the control loop that includes amplifier 77 causes the CS signal to be referenced to the bias signal that is formed on an output 131 of controller 126. Differential circuit 69 receives the bias signal through resistor 78. Thus, circuit 69 and error amplifier 77 function similarly to circuit 69 and amplifier 77 of FIG. 1 and FIG. 3. Note that in FIG. 3, resistor 103 converts current 15 into a voltage that is converted back to a current signal by resistor 50. The implementation in FIG. 4 directly forms the current for the current sense signal with sense transistor 128. For clarity of understanding the drawings, the connection between input 61 and output 131 is illustrated as external to controller 126, however, the connection may be internal to controller 126 and input 61 may be omitted. Although transistors 127 and 128 are illustrated as N-Channel transistors, those skilled in the art will appreciate that transistors 127 and 128 may be P-Channel transistors.

For such a configuration, the inverting and non-inverting inputs of amplifier 70 may be reversed.

Figure 5:
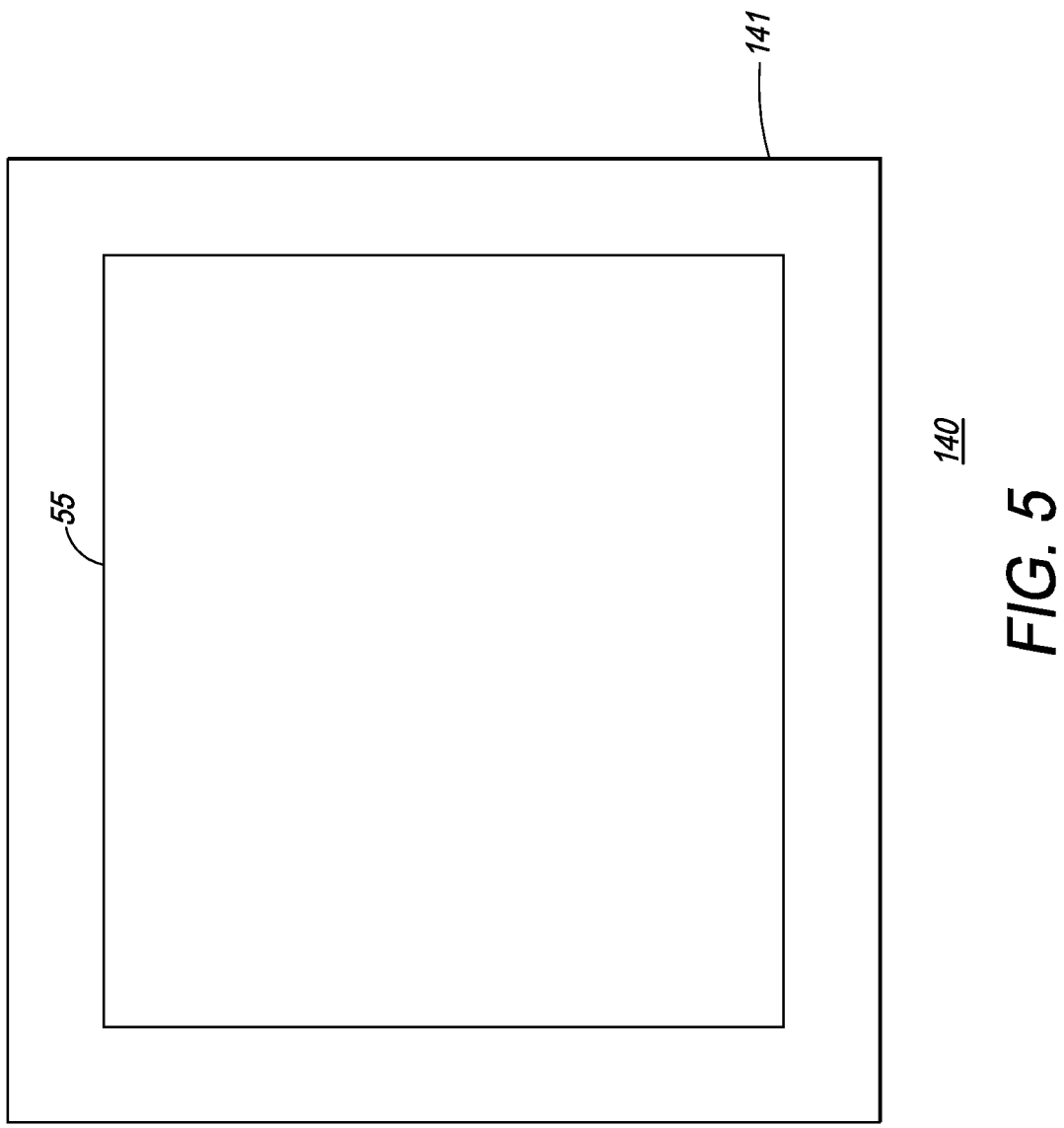
FIG. 5 schematically illustrates an enlarged plan view of a semiconductor device that includes the power supply controller of FIG. 1 in accordance with the present invention.

FIG. 5 schematically illustrates an enlarged plan view of a portion of an embodiment of a semiconductor device or integrated circuit 140 that is formed on a semiconductor die 141. Controller 55 is formed on die 141. Die 141 may also include other circuits that are not shown in FIG. 5 for simplicity of the drawing. Controller 55 and device or integrated circuit 140 are formed on die 141 by semiconductor manufacturing techniques that are well known to those skilled in the art.

In view of all of the above, it is evident that a novel device and method is disclosed. Included, among other features, is forming a power supply controller to receive a current sense signal prior to the current sense signal undergoing amplification. Configuring the power supply controller to act on a current sense signal that has not undergone amplification facilitates more accurate regulation of the output voltage. Such a configuration minimizes errors in the current sense signal and in the output voltage that is regulated by the power supply controller. Configuring the power supply controller to subtract out the potential of the bias signal facilitates using the current sense signal prior to amplification.

While the subject matter of the invention is described with specific preferred embodiments, it is evident that many alternatives and variations will be apparent to those skilled in the semiconductor arts. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A power supply controller comprising:
 a control circuit configured to form a control signal to control a power control element to supply a load current to a load and to regulate an output voltage of a power supply system;
 an error amplifier coupled to receive a current sense signal that is formed by a current sense element in order to sense a value of the load current wherein the current sense signal is referenced to a bias signal formed at a first side of the current sense element, the error amplifier configured to receive the bias signal; and
 a difference amplifier coupled to amplify the bias signal and configured to sum an output of the difference amplifier with the current sense signal at an input of the error amplifier.

2. The power supply controller of claim 1 wherein a first input of the error amplifier is configured to receive the bias signal from a first terminal of a first resistor, the first resistor having a second terminal coupled to a first terminal of the current sense element, and a second input of the error amplifier is configured to receive the current sense signal from a first terminal of a second resistor, the second resistor having a second terminal coupled to a second terminal of the current sense element and to the power control element.

3. The power supply controller of claim 2 wherein the power supply controller is one of a linear power supply controller or a multi-channel switching power supply controller.

4. The power supply controller of claim 2 further including the second input of the error amplifier configured to receive the current sense signal from a capacitor coupled between the first terminal of the first resistor and the first terminal of the second resistor.

5. The power supply controller of claim 2 further including the error amplifier configured to have a third resistor coupled between the first terminal of the second resistor and the second input of the error amplifier.

6. The power supply controller of claim 1 wherein the first side of the current sense element is an output side of the current sense element.

7. The power supply controller of claim 1 wherein the difference amplifier is coupled to receive a feedback signal that is representative of the output voltage and to sum the feedback signal with the bias signal.

8. A method of forming a power supply controller comprising:
configuring the power supply controller to form a drive signal to control a power transistor to supply a load current to a load to regulate an output voltage of a power supply system; and
configuring an error amplifier of the power supply controller to receive a current sense signal that is representative of the load current wherein the current sense signal that is referenced to a bias signal that is representative of a voltage of an output side of a current sense element that forms the current sense signal and wherein the error amplifier receives the current sense signal without the current sense signal first being amplified.

9. The method of claim 8 further including configuring the power supply controller to receive the current sense signal that is representative of a time averaged value of N number of channel currents of a multi-phase power supply system.

10. The method of claim 8 further including configuring the error amplifier to remove the bias signal from an output signal of the error amplifier.

11. The method of claim 10 wherein configuring the error amplifier to remove the bias signal from the output signal of the error amplifier includes coupling a difference amplifier to receive the bias signal and coupling an output of the difference amplifier to an input of the error amplifier.

12. The method of claim 11 further including coupling the difference amplifier to receive a feedback signal that is representative of the output voltage and to sum the feedback signal with the bias signal.

13. The method of claim 8 wherein configuring the error amplifier of the power supply controller to receive the current sense signal includes configuring the error amplifier to receive the current sense signal that is referenced to a bias signal that is representative of a voltage of a first side of a current sense element that forms the current sense signal; and coupling a difference amplifier to receive the bias signal and couple an amplified bias signal to the error amplifier wherein the error amplifier cancels the amplified bias signal from the bias signal.

14. The method of claim 13 further including coupling the difference amplifier to sum a feedback signal that is representative of the output voltage with the bias signal and cancel out a reference signal from the bias signal.

15. A method of forming a power supply controller comprising:
configuring the power supply controller to form a drive signal to control a power transistor to supply a load current to a load to regulate an output voltage of a power supply system; and
configuring an error amplifier of the power supply controller to receive a current sense signal that is representative of the load current wherein the current sense signal is referenced to a bias signal that is representative of an output potential of a current sense element used to form the current sense signal.

16. The method of claim 15 wherein configuring the error amplifier of the power supply controller to receive the current sense signal includes configuring the error amplifier to receive the current sense signal prior to the current sense signal undergoing amplification.

17. The method of claim 15 wherein configuring the error amplifier of the power supply controller to receive the current sense signal includes configuring the error amplifier to receive the current sense signal on a first input of the error amplifier and to receive the bias signal on a second input having a polarity that is opposite to a polarity of the first input of the error amplifier.

18. The method of claim 17 further including coupling a difference amplifier to receive a feedback signal that is representative of the output voltage, sum the feedback signal with the bias signal, and sum an output of the difference amplifier to the first input of the error amplifier.

19. The method of claim 15 wherein the power supply controller is one of a switching power supply controller or a linear power supply controller.

* * * * *